March 17, 1959  C. J. LAMBERTON ET AL  2,878,455
THREE WINDING TRANSFORMER
Filed Feb. 28, 1956
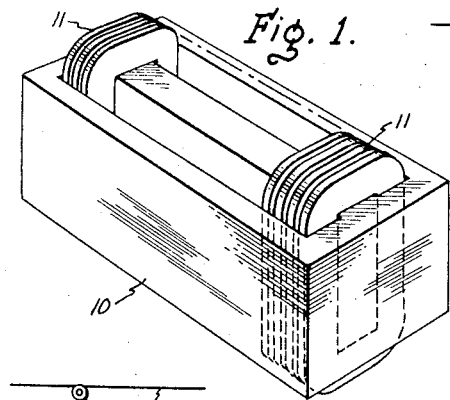
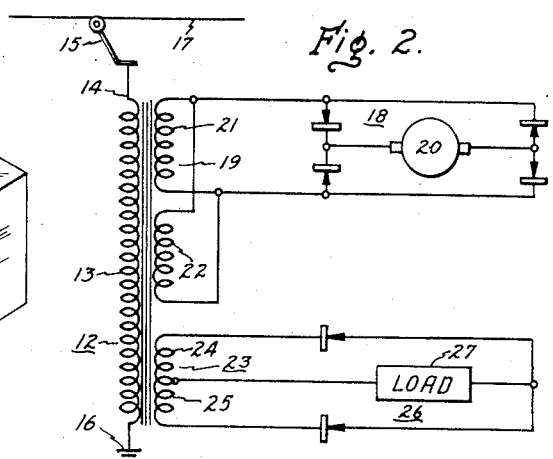
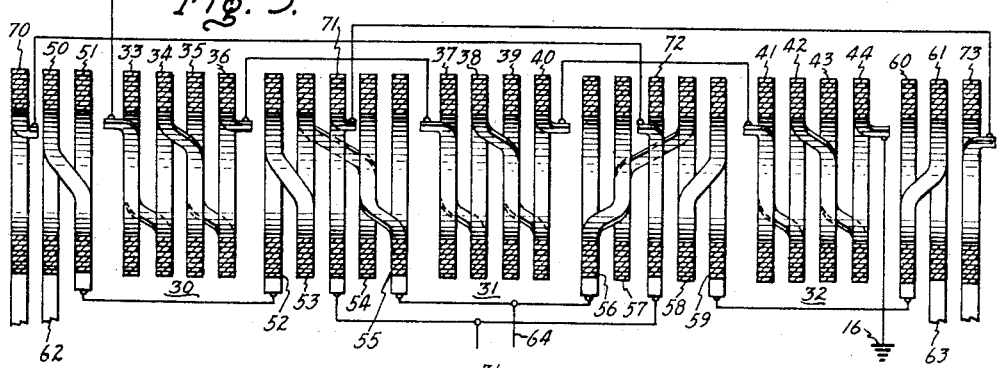
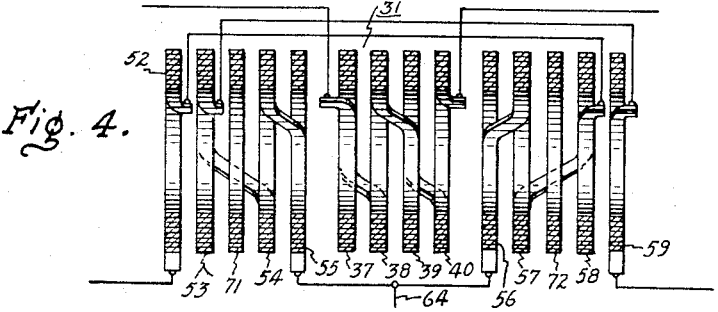
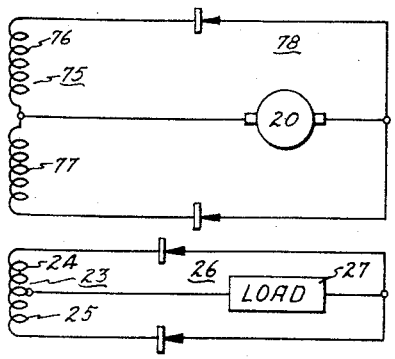
Inventors
Clifford J. Lamberton,
Everett F. Christensen,
David Keating,
by Gilbert P. Tarleton
His Attorney.

United States Patent Office 2,878,455
Patented Mar. 17, 1959

2,878,455

THREE WINDING TRANSFORMER

Clifford J. Lamberton and Everett F. Christensen, Pittsfield, Mass., and David Keating, Oakland, Calif., assignors to General Electric Company, a corporation of New York Application February 28, 1956, Serial No. 568,341

14 Claims. (Cl. 336—183)

This invention relates to stationary electrical induction apparatus, and more in particular to a transformer having a plurality of windings. Although the invention hereinafter disclosed is specifically described in connection with a three winding transformer, it will be obvious that the invention is not thus limited.

In the past, transformers have frequently been employed in combination with electric locomotives in order to transform the high voltage of an overhead line to a low voltage suitable for operation of the traction motors of the locomotive. It is desirable to provide an auxiliary source of power for miscellaneous uses of the locomotive, and this has been done either by providing additional terminals on the low voltage winding of the transformer, providing a third winding on the transformer, or providing a separate transformer.

In the event that it is desired to isolate the auxiliary source of power from the traction motor circuit, one of the latter two means must be provided. If a separate auxiliary transformer is used for the auxiliary source of power, an additional high voltage bushing must be employed since, due to size requirements, the main transformer in a locomotive generally utilizes all of the available vertical space. In addition, the separate transformer requires additional space which is not always available, and increases the weight of the transforming apparatus.

While the size, cost and weight of the transformer apparatus are greatly reduced by providing an auxiliary winding on the main transformer, certain difficulties arise if the auxiliary winding is subject to half cycle duty as may occur when the auxiliary circuit power is rectified to provide a direct current source of electrical power.

For example, if the auxiliary winding of the transformer is to supply a diametric type of rectifier, any unbalance in the half cycle currents of the halves of the auxiliary winding results in unequal direct current components of magnetization in the transformer core. If the low voltage winding is comprised of several sections, such as two parallel connected sections to supply a bridge type of rectifier or two series connected sections to supply a diametric type of rectifier, conventional winding arrangements result in unequal voltage being induced in the several windings due to the unequal magnetization of the core. This is particularly detrimental in the case of parallel connected low voltage windings, since undesirable circulating currents are thereby produced.

It is therefore an object of this invention to provide an improved transformer of the type having at least one winding with a pair of winding groups adapted for opposite half cycle operation.

Another object is to provide means for substantially eliminating unbalanced conditions in a transformer having at least one winding with a pair of winding groups adapted for opposite half cycle operation.

Still another object of this invention is to provide means for substantially eliminating circulating currents in parallel connected windings of a transformer having a separate winding with a pair of winding groups adapted for half cycle operation.

A further object is to provide a transformer of the type having a winding with a pair of winding groups adapted for opposite half cycle operation in which unbalanced conditions in the transformer resulting from unbalanced half cycle operation are substantially eliminated. Opposite half cycle operation is defined as the condition that occurs when separate winding groups conduct current only during opposite half cycles of the excitation voltage.

Briefly stated, in accordance with one aspect of this invention, we provide a transformer having a magnetic core on which is located a winding having two sections or groups of winding turns. The winding is adapted for opposite half cycle operations, that is, the groups of the winding conduct current during opposite half cycles, such as may occur when the winding is connected to supply electrical power to a diametric type of rectifier circuit. The sections or groups of turns are arranged on the core such that the half cycle current flows through the two groups of windings resulting in opposite magnetic effects on the core. A second winding is provided on the core, and the second winding is also divided into two groups of a plurality of turns each. Each group of turns of the second winding is closely inductively coupled to substantially the same number of turns of each group of turns of the first winding.

A third winding, which may be a high voltage winding, is also provided on the core, and the winding turns of the third winding are separated from the turns of the first winding by turns of the second winding in order to provide a relatively high leakage reactance for the first winding.

While the specification concludes with claims particularly pointing out and distinctly claiming the subject matter which we regard as our invention, it is believed the invention will be better understood from the following description taken in connection with the accompanying drawing in which:

Fig. 1 is a perspective view of the core and coils of a transformer on which the winding arrangement of this invention may be employed, Fig. 2 is a circuit diagram of preferred connections of the transformer of this invention when used to supply electrical power to a traction motor and an independent direct current load, Fig. 3 is a cross-sectional view of the coils of the transformer and illustrating the preferred winding arrangement of this invention, Fig. 4 is a modification of a portion of the winding arrangement of Fig. 3, and Fig. 5 is a modification of a portion of the circuit of Fig. 2.

Referring now to the drawings, and in particular to Fig. 1, a transformer is therein illustrated having a core 10. A plurality of coils 11 are arranged on one leg of the transformer in the usual manner for a shell-type transformer. While this invention is perhaps more adaptable to a transformer such as illustrated in Fig. 1, it will be obvious from the following disclosure that other structures may be employed without departing from the invention.

In Fig. 2 we have illustrated a typical simplified circuit of a transformer employed to supply power for a locomotive. In this figure, a transformer 12 has a high voltage winding 13 connected on one end 14 to a trolley 15 and connected on the other end to a ground reference potential 16. The trolley 15 is arranged to contact an overhead electrical power line 17 or third rail.

A bridge rectifier circuit 18 is connected in a conventional manner to a low voltage winding 19 of the transformer for supplying power to the traction motor 20 of the locomotive. The low voltage winding 19 is comprised of two parallel connected sections or groups of turns 21 and 22. An auxiliary winding 23 is also provided on the transformer 12, and this winding is comprised of two groups of winding turns 24 and 25 connected in the conventional manner to a diametric type of rectifier circuit 26 for supplying a direct current load 27.

Referring now to Fig. 3, which illustrates the preferred winding arrangement of this invention, therein is shown a plurality of disk-shaped coils axially spaced apart and arranged in a manner such that they may be used on the conventional transformer of Fig. 1.

The high voltage winding which is connected on one end to the trolley 15 and on the other end to the reference ground potential 16, is comprised of three serially connected groups 30, 31 and 32 of serially connected coils. The first group 30 of coils is comprised of serially connected coils 33, 34, 35 and 36, the second group of coils 31 is comprised of serially connected coils 37, 38, 39 and 40, and the third group of coils 32 is comprised of serially connected coils 41, 42, 43 and 44.

While each group of coils of the high voltage winding is illustrated as being comprised of four coils, it will be obvious that any number of coils may be employed as dictated by the particular design requirements of the transformer.

The low voltage winding is comprised of pairs of coils 50 and 51, 52 and 53, 54 and 55, 56 and 57, 58 and 59, and 60 and 61. These coils are serially connected in the aforesaid order and have one end lead 62 from coil 50, another end lead 63 from coil 61, and a third lead 64 at the junction between coils 55 and 56. The coils 50, 51, 52, 53, 54 and 55 comprise the first low voltage coil group 21 of the circuit of Fig. 2, and the coils 56, 57, 58, 59, 60 and 61 comprise the second coil group 22 of Fig. 2. The coils 50 and 51 are located adjacent one end of high voltage winding group 30, and the coils 52 and 53 are located adjacent the other end of high voltage winding group 30. Similarly, coils 54 and 55 are located adjacent one end of high voltage winding coil group 31, coils 56 and 57 are located adjacent the other end of coil group 31, coils 58 and 59 are located adjacent one end of high voltage winding coil group 32, and coils 60 and 61 are located adjacent the other end of coil group 32.

It shall be understood, of course, that the number of coils of each group of the low voltage winding is determined by the desired design of the transformer, and therefore the illustration of the low voltage winding as being comprised of pairs of coils is not a limitation. It is preferred that at least one coil be used at each location of the pairs of coils.

The auxiliary winding is comprised of coils 70, 71, 72 and 73. Coil 70 is located adjacent the low voltage coils 50 and 51 on the end away from the coil group 30, coil 71 is located between low voltage coils 52, 53 and 54, 55, auxiliary coil 72 is located between low voltage coils 56, 57 and 58, 59, and auxiliary coil 73 is located adjacent low voltage coils 60 and 61 on the end away from coil group 32. The auxiliary winding coil 70 is serially connected with auxiliary winding coil 72, and similarly coil 71 is serially connected with coil 73. The coils 70 and 72 correspond to the coil group 24 of the circuit of Fig. 2, and the coils 71 and 73 correspond to the coil group 25 of Fig. 2. The coils 71 and 72 are connected together to form the center tap of the winding 23 of Fig. 2, and the auxiliary winding coils are arranged on the core in such a manner that the half cycle current of coils 70 and 72 results in the opposite magnetic effect on the core of the transformer as that produced by the half cycle current flowing through winding 71 and 73. The auxiliary winding coils preferably each have the same number of turns so that each major group of the low voltage winding is inductively coupled to substantially the same number of turns of each group of the auxiliary winding.

In the coil arrangement of Fig. 3, the auxiliary coils are placed a maximum distance from the high voltage coils (in each case in the arrangement of Fig. 3 being separated from the nearest high voltage coil by two low voltage winding coils) in order to obtain reactance of the magnitude required to limit a fault current originating in the auxiliary rectifier circuit. The auxiliary winding coils are also located so that they produce an ampere turn distribution of the half cycle current to effect the low voltage winding groups in substantially the same degree. As has been previously stated, if the low voltage winding groups are parallel connected, as illustrated in Fig. 2, unbalanced induced voltages in these coils caused by unbalanced half cycle currents results in undesirable circulating current in the low voltage coils. In the coil arrangement of Fig. 3, however, half cycle current unbalance in the auxiliary coils does not result in low voltage winding circulating current since each half of the low voltage winding is effected by unbalance in a similar manner.

In the modification of Fig. 4, the coil arrangement, high voltage winding connections, and auxiliary winding connections are the same as in Fig. 3. In this modification, however, the low voltage winding coil 53 is serially connected with coil 58, 57 and 56, in that order. Similarly, the low voltage winding coil 59 is serially connected with voltage winding coils 54, 55 and 56 in that order. The remainder of the connections is the same as in Fig. 3.

When the low voltage winding groups are to be parallel connected, as in the circuit of Fig. 2, the coils must be wound in such a manner that the interconnected terminals have the same instantaneous polarities of voltage. Thus, in Fig. 3, the direction of winding of the turns around the core of the low voltage winding group from lead 62 through coils 50, 51, 52, 53, 54 and 55 is opposite of that for the other group of the low voltage winding from the lead 63 and progressing through winding coils 61, 60, 59, 58, 57 and 56. This arrangement permits the connection together of leads 62 and 63, and also the joining of coils 55 and 56. Similarly, in Fig. 4, the direction of winding of the turns around the core of coils 53, 58, 57 and 56 is opposite to that of the winding of coils 59, 54, 55 and 56.

Referring to Fig. 5, therein is illustrated a modification of the connections of the circuit of Fig. 2. In this figure, the low voltage winding 75 is comprised of serially connected groups 76 and 77, and is connected to a diametric type of rectifier circuit 78. While this circuit has the advantage that a fewer number of rectifier elements are required, a greater amount of copper is required in the transformer, and therefore, the weight, size and cost of such a transformer is somewhat greater than that of the parallel connected low voltage winding transformer of Fig. 2. While either the coil arrangement of Fig. 3 or the coil arrangement of Fig. 4 may be employed in the transformer of the circuit of Fig. 5, it is preferred that the coil arrangement of Fig. 4 be so employed. This preference arises from the fact, in the coil grouping of the arrangement of Fig. 4, the ampere turn distribution of each of the low voltage winding groups is more nearly balanced with respect to the ampere turn distribution of the high voltage winding, thereby reducing the reactance of the low voltage winding. The balancing of the ampere turn distribution of the low voltage and high voltage windings is not as important in the circuit of Fig. 2, since in that case each low voltage winding group carries full cycle current. In the circuit of Fig. 5, the reactance of the low voltage winding groups is undesirably increased if the ampere turn distribution between each of these groups and the high voltage winding is not balanced since each of these groups carries current only during one half cycles. In other words, where the low voltage winding is employed in a diametric type of circuit, if each group of the low voltage winding does not have a substantially balanced ampere turn distribution with respect to the high voltage winding, the reactances of the low voltage winding groups may be unbalanced. Therefore, the coil arrangement of Fig. 4, in which each half of the high voltage winding is coupled to three coils of each group of the low voltage winding, the low voltage winding reactance will be lower than in the case of the arrangement of Fig. 3 in which each low voltage winding is coupled to only one half of the high voltage winding.

It will be understood, of course, that if the connections of the circuit of Fig. 5 are employed, the low voltage winding groups must be arranged so that the opposite terminals of the winding have opposite instantaneous induced polarities of voltage. Thus, in the arrangement of Fig. 3, the instantaneous induced polarities at the leads 62 and 63 must be opposite, and similarly in the arrangement of Fig. 4 the outside lead of the coil 53 must have an opposite instantaneous induced polarity from that of the outside leads of the coil 59.

The coil arrangement of Fig. 4 also has the advantage that short circuit forces are not as concentrated as in the coil arrangement of Fig. 3, when the low voltage winding is used in a diametric rectifier circuit, the short circuit forces in the low voltage winding being kept to a minimum due to a balanced ampere turn distribution between the low and high voltage windings.

It will be obvious that the coil arrangement of this invention may also advantageously be employed even if none of the windings is adapted for half cycle operation. For example, both the auxiliary winding and the low voltage winding could be connected to bridge rectifier circuits. In this event, the coil arrangement still provides the advantages of equalization of magnetic effects produced in the core, equalization of reactance of the several groups of each winding, and the desirable higher reactance in the auxiliary winding.

From the foregoing disclosure, it is seen that this invention provides means for substantially eliminating unbalanced voltage conditions in a transformer, where at least one of the windings is adapted for half cycle operation, and that the resultant transformer is lighter, smaller and less costly than if separate transformers were employed for the same purpose. The coil arrangement provides the desirable high reactance for an auxiliary winding connected to a diametric rectifier circuit, and substantially eliminates the production of circulating current in parallel connected windings coupled to the auxiliary windings.

It will be understood, of course, that, while the forms of the invention herein shown and described constitute preferred embodiments of this invention, it is not intended herein to illustrate all of the possible equivalents or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A transformer comprising a magnetic core and a winding on said core having first and second serially connected sections of a plurality of successive turns each, each axial half of said winding having substantially the same number of turns from each of said sections, said first and second sections being connected and wound to have opposite magnetizing effects on said core as a result of opposite half cycle current flow therethrough.

2. A transformer comprising a magnetic core, a first winding on said core, said first winding having first and second serially connected sections of a plurality of successive turns each and a second winding inductively coupled to said first winding, each axial half of said second winding being inductively coupled to substantially the same number of turns from each of said first and second sections, said first and second sections being connected and wound to have opposite magnetic effects on said core as a result of opposite half cycle current flow therethrough.

3. A transformer comprising a magnetic core, a first winding on said core, said first winding having first and second serially connected sections of a plurality of successive turns each, and a second winding on said core and inductively coupled to said first winding, said second winding having first and second sections of a plurality of successive turns each, each of said sections of said second winding being inductively coupled to substantially the same number of turns from each of the sections of said first winding, said sections of said first winding being connected and wound to have opposite magnetic effects on said core as a result of opposite half cycle current flow therethrough.

4. A transformer comprising a magnetic core, a first winding on said core, said first winding having first and second serially connected sections of a plurality of successive turns each, a second winding on said core and inductively coupled to said first winding, said second winding having first and second sections of a plurality of successive turns each, and a third winding on said core and inductively coupled to said second winding, each of said sections of said second winding being inductively coupled to substantially the same number of turns from each section of said first winding, said sections of said first winding being connected and wound to have opposite magnetic effects on said core as a result of opposite half cycle current flow therethrough, said second winding being interspersed between said first and third windings.

5. A transformer comprising a magnetic core, and a high voltage winding, a low voltage winding and an auxiliary winding on said core, said auxiliary winding and said low voltage winding each having a pair of serially connected sections of a plurality of turns each, the sections of said auxiliary winding being connected and wound to have opposite magnetic effects on said core as a result of opposite half cycle current flow therethrough, each section of said low voltage winding being inductively coupled to substantially the same number of turns of each section of said auxiliary winding, said auxiliary winding being separated from said high voltage winding by the turns of said low voltage winding.

6. A transformer comprising a magnetic core, and a high voltage winding, a low voltage winding, and an auxiliary winding on said core, said auxiliary winding having a first and second serially connected sections each having a plurality of turns, said first and second sections of said auxiliary winding being connected and wound to have opposite magnetic effects on said core as a result of opposite half cycle current flow therethrough, said low voltage winding having a pair of parallel connected sections each being inductively coupled to substantially the same number of turns of each of said auxiliary winding sections, the turns of said auxiliary winding being separated from said high voltage winding by said low voltage winding.

7. A transformer comprised of a plurality of disk-shaped coils of a plurality of turns each and axially spaced apart on the leg of a magnetic core, said coils comprising a first and second winding, the coils of said first winding being comprised of two serially connected groups connected and wound to have opposite magnetic effects on said core as a result of opposite half cycle current flow therethrough, the coils of said second winding being comprised of two groups with each group of coils of said second winding being inductively coupled to substantially the same number of turns of the coils of each group of said first winding.

8. A transformer comprised of a plurality of disk-shaped coils of a plurality of turns each and axially spaced apart on the leg of a magnetic core, said coils comprising a first and second winding, the coils of said first winding comprising two serially connected groups, the two said groups being connected and wound to have opposite magnetic effects on said core as a result of opposite half cycle current flow therethrough, the coils of said second winding comprising two parallel connected groups, each of said parallel groups being inductively coupled to substantially the same number of turns of the coils of each group of said first winding.

9. A transformer comprised of a plurality of disk-shaped coils of a plurality of turns each and axially spaced apart on the leg of a magnetic core, said coils comprising a first, second, and third winding, the coils of said first winding comprising two serially connected groups, the coils of said second winding comprising two groups, each of the groups of coils of said second winding being inductively coupled to substantially the same number of turns of the coils of each group of said first winding, each coil of said first winding being separated from the nearest coil of said third winding by at least one coil of said second winding.

10. A transformer comprised of a plurality of disk-shaped coils of a plurality of turns each and axially spaced apart on the leg of a magnetic core, said coils comprising a high voltage winding, a low voltage winding, and an auxiliary winding, the coils of said auxiliary winding comprising two serially connected groups, the said two groups of coils being connected so that opposite half cycle current flow therethrough results in opposite magnetic effects on said core, the coils of said low voltage winding comprising two parallel connected groups, each of the groups of said low voltage winding being inductively coupled to substantially the same number of turns of coils of each group of said auxiliary winding, said coils being arranged on said core so that each of the high voltage winding coils is axially separated from the nearest auxiliary winding coil by at least one coil of the low voltage winding.

11. A transformer comprised of a plurality of disk-shaped coils of a plurality of turns each and axially spaced apart on the leg of a magnetic core, said coils comprising a high voltage winding, a low voltage winding, and an auxiliary winding, the coils of said high voltage winding being comprised of first, second and third spaced apart groups of coils, the coils of said low voltage winding comprising fourth and fifth groups of coils, and the coils of said auxiliary winding comprising sixth and seventh groups of serially connected coils, said sixth and seventh groups of coils being wound and connected so that opposite half cycle current flow therethrough results in opposite magnetic effects on said core, the coils being arranged on said core in the following order: sixth group, fourth group, first group, fourth group, seventh group, fourth group, second group, fifth group, sixth group, fifth group, third group, fifth group, and seventh group.

12. The transformer of claim 11 in which said fourth and fifth groups of coils are parallel connected.

13. The transformer of claim 11 in which said fourth and fifth groups of coils are serially connected.

14. In a transformer of the type having at least a first winding adapted to supply electric power to a diametric type of rectifier circuit and a second winding of two groups of winding turns, means for substantially eliminating unequal voltages from being induced in the groups of said second winding comprising a plurality of disk-shaped coils of a plurality of turns and axially spaced on a magnetic core, said coils comprising said first and second windings, the coils of said first winding being comprised of first and second serially connected groups of coils connected and wound on said core so that opposite half cycle current therethrough results in opposite magnetic effects on said core, each group of turns of said second winding being inductively coupled to substantially the same number of turns of each of the groups of said first winding.

References Cited in the file of this patent
UNITED STATES PATENTS

| | | |
|---|---|---|
| 1,445,978 | Stephens | Feb. 20, 1923 |
| 1,775,880 | Whitlock | Sept. 16, 1930 |
| 1,872,247 | Cole et al. | Aug. 16, 1932 |
| 1,901,368 | Jones | Mar. 14, 1933 |